(12) United States Patent
Tidwell et al.

(10) Patent No.: US 6,388,641 B2
(45) Date of Patent: May 14, 2002

(54) SCANNED BEAM DISPLAY WITH ADJUSTABLE ACCOMMODATION

(75) Inventors: Michael Tidwell, Seattle; Charles D. Melville; Richard S. Johnston, both of Issaquah, all of WA (US); Joel S. Kollin, Long Island City, NY (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/898,413

(22) Filed: Jul. 3, 2001

Related U.S. Application Data

(62) Division of application No. 09/188,993, filed on Nov. 9, 1998.

(51) Int. Cl.$^7$ ................................................. G09G 5/00
(52) U.S. Cl. ........................................... 345/8; 359/354
(58) Field of Search ............ 345/7–9, 32; 359/212–214, 359/223–224, 630–633, 354, 201–202, 643

(56) References Cited

U.S. PATENT DOCUMENTS

| | | | | |
|---|---|---|---|---|
| 5,102,222 A | * | 4/1992 | Berger et al. | 356/367 |
| 5,289,001 A | * | 2/1994 | Arimoto et al. | 250/236 |
| 5,485,172 A | * | 1/1996 | Sawachika et al. | 345/8 |
| 5,596,339 A | * | 1/1997 | Furness et al. | 345/8 |
| 5,751,465 A | * | 5/1998 | Melville et al. | 359/199 |
| 5,903,397 A | * | 5/1999 | Melville et al. | 345/8 |
| 5,969,871 A | * | 10/1999 | Tidwell et al. | 359/620 |
| 6,014,259 A | * | 1/2000 | Wohlstadter | 359/619 |
| 6,043,799 A | * | 3/2000 | Tidwell | 345/7 |
| 6,046,720 A | * | 4/2000 | Melville et al. | 345/108 |
| 6,191,761 B1 | * | 2/2001 | Melville et al. | 345/32 |
| 6,204,829 B1 | * | 3/2001 | Tidwell | 345/7 |
| 6,204,832 B1 | * | 3/2001 | Melville et al. | 340/815.42 |
| 6,281,862 B1 | * | 8/2001 | Tidwell et al. | 345/32 |

* cited by examiner

Primary Examiner—Bipin Shalwala
Assistant Examiner—Ricardo Osorio
(74) Attorney, Agent, or Firm—Steven P. Koda

(57) ABSTRACT

A scanning beam display controls the curvature of scanning light wave impinging on the eye to simulate image points of differing depth. To simulate an object at a far distance the generated light waves are flatter. To simulate closer objects, the light wave curvature increases. When changing the curvature of the light waves, the eye responds by altering its focus. The curvature of the light waves thus determines the apparent focal distance from the eye to the virtual object. To vary the curvature, either a variable focus lens or a variable index of refraction device is used. Alternatively, a moving point source is used. The generated apparent distance of a virtual object is correlated to a detected distance in a background field of view. Intensity of the virtual object is correlated to detected intensity of background light.

16 Claims, 9 Drawing Sheets

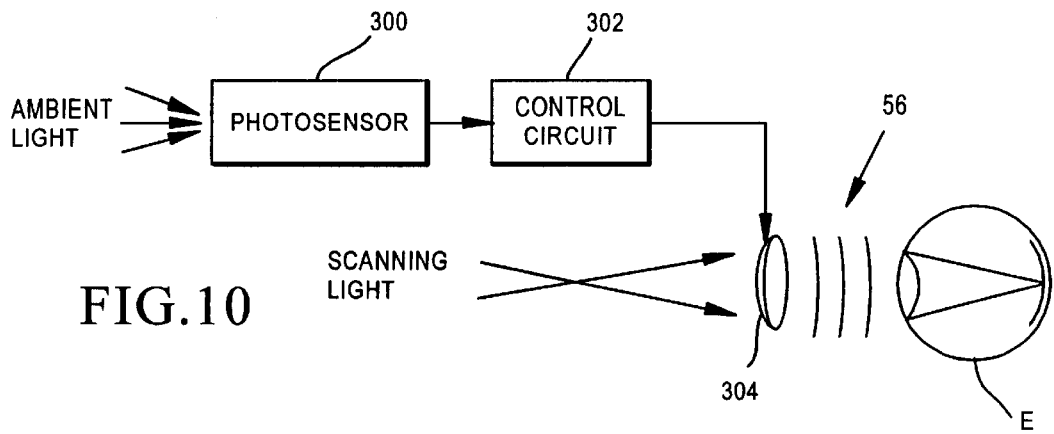
FIG.10
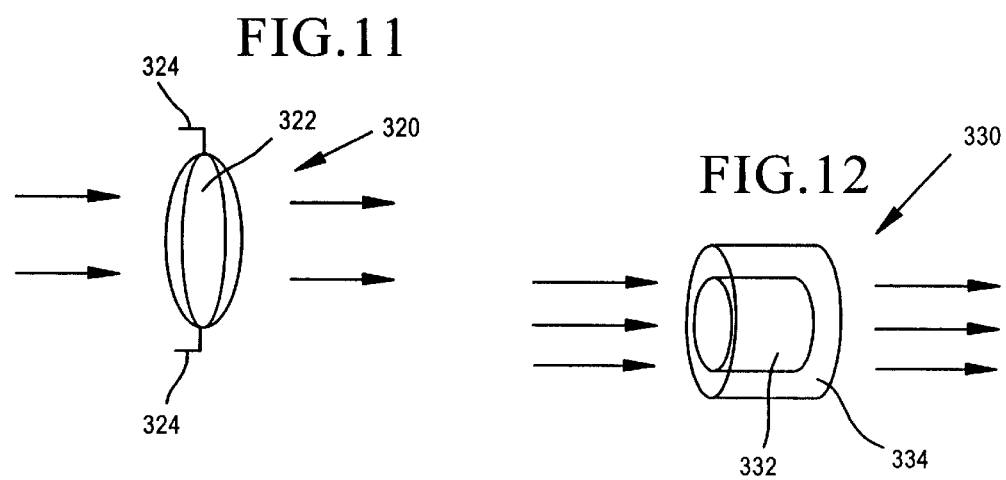
FIG.11
FIG.12
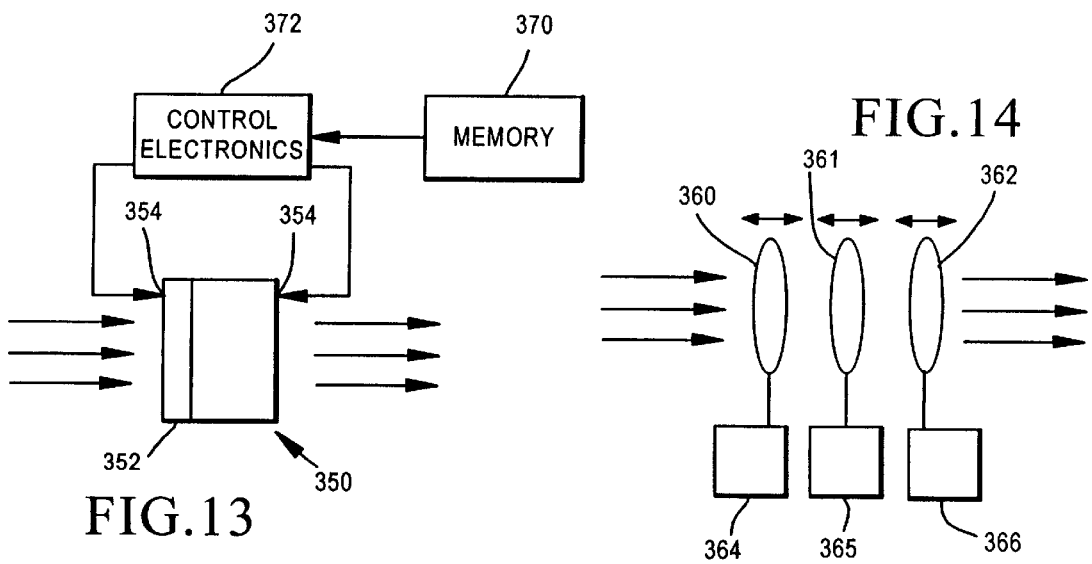
FIG.13
FIG.14

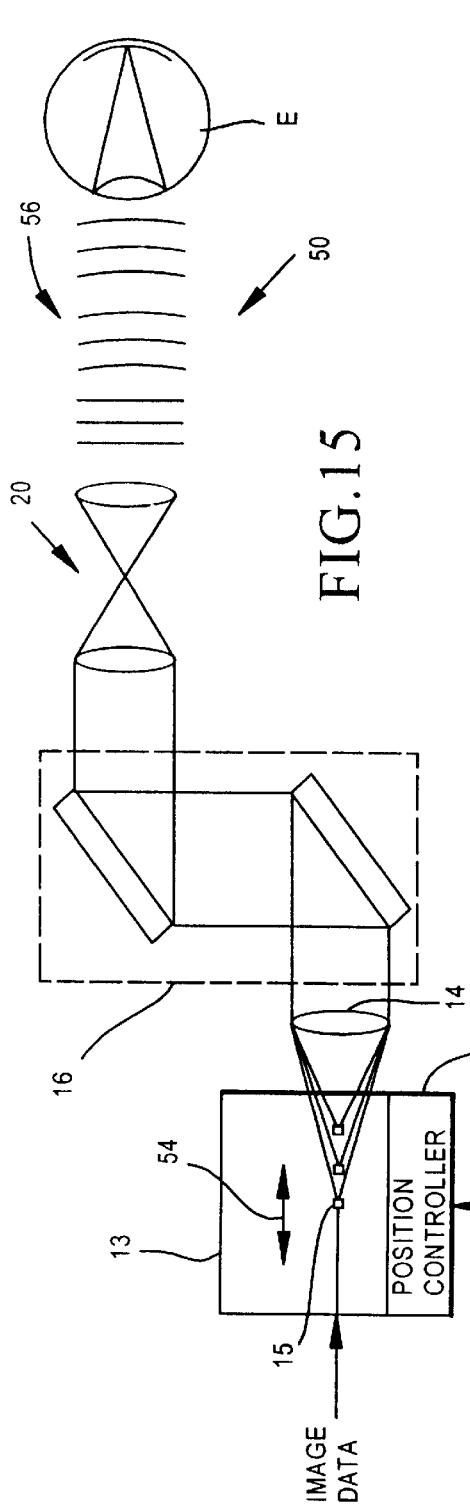
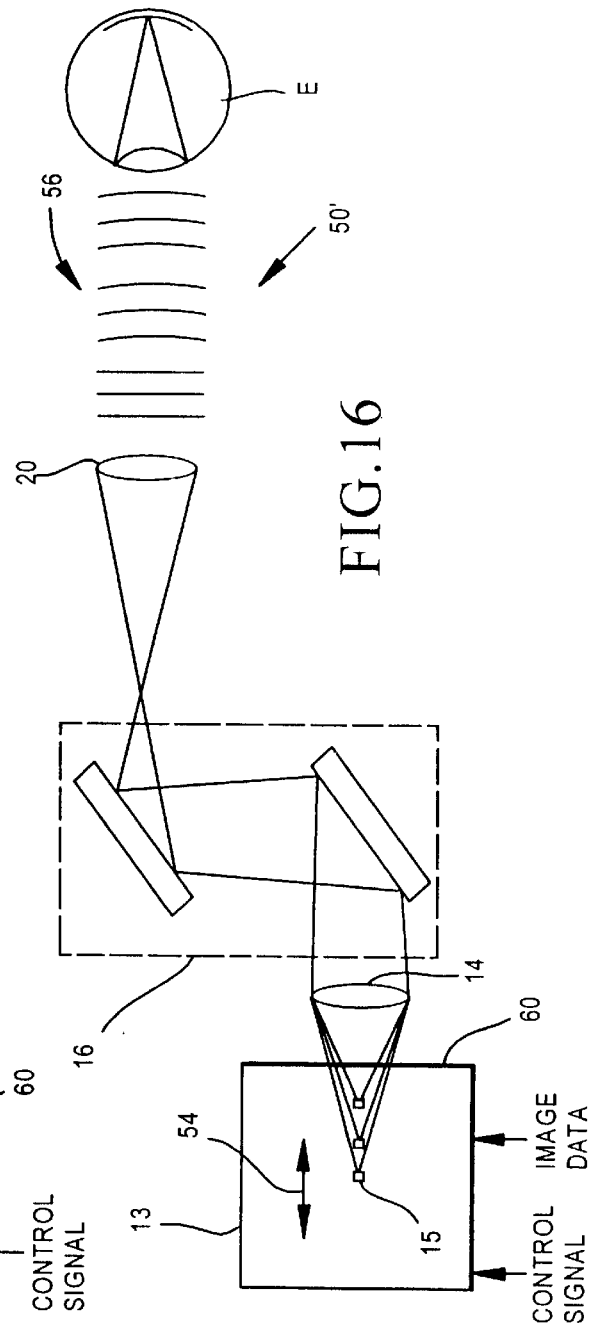
FIG.15
FIG.16

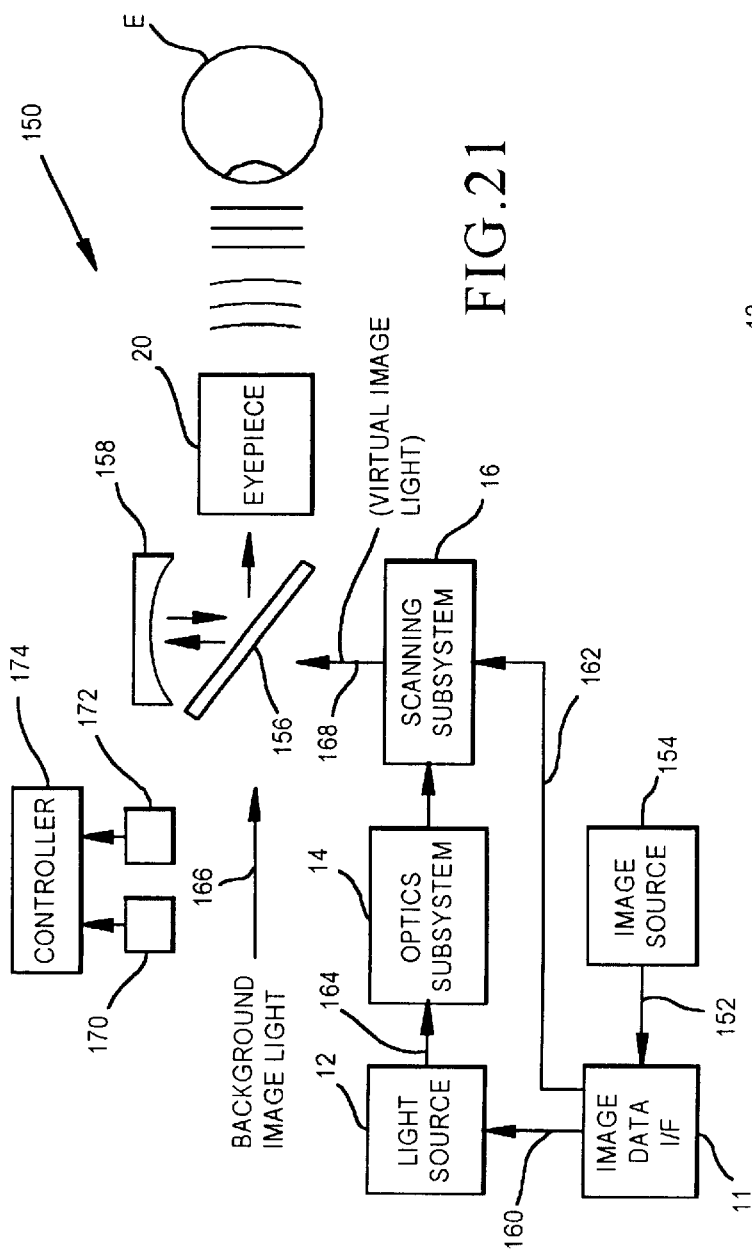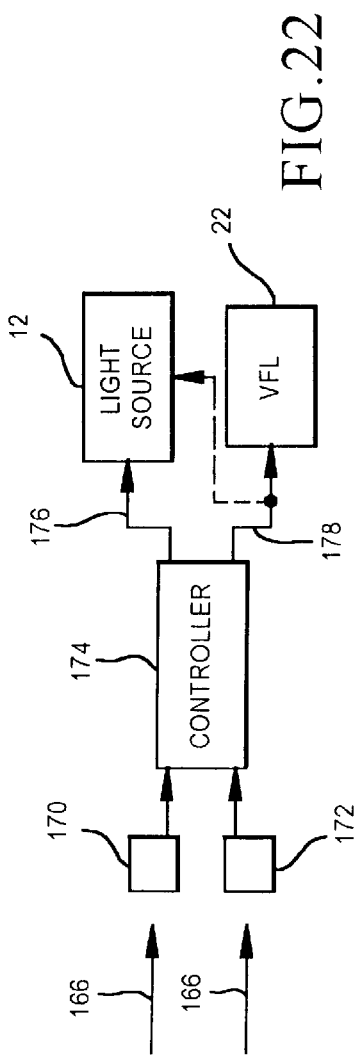

SCANNED BEAM DISPLAY WITH ADJUSTABLE ACCOMMODATION

CROSS REFERENCE TO RELATED APPLICATIONS

This is a divisional of U.S. patent application Ser. No. 09/188,993 filed Nov. 9, 1998 of Michael Tidwell et al. for "Scanned Beam Display with Adjustable Acommodation." The content of such application is incorporated herein by reference and made a part hereof.

This invention is related to U.S. patent application Ser. No. 09/009,759 filed Jan. 20, 1998 of Charles D. Melville for Augmented Imaging Using A Silhouette To Improve Contrast. This invention also is related to U.S. patent application Ser. No. 09/188,991 filed Nov. 9, 1998 of Charles D. Melville et al. for Method and Apparatus for Scanning Optical Distance. The content of all such applications are incorporated herein by reference and made a part hereof.

BACKGROUND OF THE INVENTION

This invention relates to scanning beam display devices, and more particularly to optical configurations for scanning beam display devices.

A scanning beam display device is an optical device for generating an image that can be perceived by a viewer's eye. Light is emitted from a light source, collimated through a lens, then passed through a scanning device. The scanning device defines a scanning pattern for the light. The scanned light converges to focus points of an intermediate image plane. As the scanning occurs, the focus point moves along the image plane (e.g., in a raster scanning pattern). The light then diverges beyond the plane. An eyepiece is positioned along the light path beyond the intermediate image plane at some desired focal length. An "exit pupil" occurs shortly beyond the eyepiece in an area where a viewer's eye is to be positioned.

A viewer looks into the eyepiece to view an image. The eyepiece receives light that is being deflected along a raster pattern. Light thus impinges on the viewer's eye pupil at differing angles at different times during the scanning cycle. This range of angles determines the size of the field of view perceived by the viewer. Modulation of the light during the scanning cycle determines the content of the image.

For a see-through display, a user sees the real world environment around the user, plus the added image of the scanning beam display device projected onto the retina. When the user looks at an object in the field of view, the eye performs three basic functions. For one function, each eye moves so that the object appears at the center of vision. For a second function, each eye adjusts for the amount of light coming into the eye by changing the diameter of the iris opening. For a third function, each eye focuses by changing the curvature of the eye lens. If the focal distance from the third function does not match the distance to the point of convergence, then the brain detects a conflict. Nausea may occur.

SUMMARY OF THE INVENTION

According to the invention, a more lifelike image is generated with a virtual retinal display by including a method and apparatus of variable accommodation.

According to one aspect of the invention, the scanning beam display device controls the curvature of scanning light waves impinging on the eye to simulate image points of differing depth. Images at far distances out to infinity have flat light waves impinging the eye. Images at near distances have convex-shaped light waves impinging the eye. Thus, to simulate an object at a far distance the light waves transmitted from the display to the eye are flat. To simulate closer objects, the light wave curvature increases. The eye responds to the changing curvature of the light waves by altering its focus. The curvature of the generated light waves relates to a desired, 'apparent distance' between a virtual object and the eye.

According to another aspect of the invention, a variable focus lens is included in the virtual retinal display to alter the shape of the light waves. The lens varies its focal length over time as desired. For example, for an image that is 640 by 480 pixels, there are 307,200 image elements. The variable focus lens is able to adjust its focal length fast enough to define a different focal length for each image element.

According to another aspect of the invention the variable focus lens is formed by a resonant crystalline quartz lens. The resonant lens changes thickness along its optical axis, thus varying its focal length. The lens varies in focal length with respect to time. By varying the time when a light pulse enters the resonant lens, the focus is varied. A non-resonant lens is used in another embodiment where its response time is fast enough to focus for each image element.

According to another aspect of the invention, a device which changes its index of refraction over time is used instead of a variable focus lens. In one embodiment an acouso-optical device (AOD) or an electro-optical device (EOD) is used. In the AOD, acoustic energy is launched into an acousto-optic material to control the index of refraction of the AOD. In one embodiment of an EOD, a lens is coated with a lithium niobate layer. An electric field is applied across the lithium niobate material to vary the index of refraction of the coating. Changing the index of refraction changes the effective focal length of the lens to vary the focus distance of the virtual image.

In another embodiment an optical device changes its index of refraction based upon the intensity (frequency) of an impinging infrared beam. The current intensity of the infrared beam in effect sets the current index of refraction for the device. Varying the intensity of the infrared beam varies the index of refraction to vary the effective focal length of the optical device.

Another embodiment includes a compressible, cylindrical gradient index lens as a focusing element. A cylindrical piezoelectric transducer compresses an outer shell of the gradient index cylinder. Compression of the cylinder shifts the physical location of the lens material to changes the index of refraction gradient, thereby changing the focal length. Another embodiment includes a current driven device that uses free-carrier injection or depletion to change its index of refraction.

According to another aspect of the invention, a variable focus lens serves to correct the curvature of the intermediate image plane for errors introduced by the scanners or from the aberration of other optical elements. In an exemplary embodiment, a aberration map of the system is stored in a look-up table in memory. The aberration map provides correction data for each image element. The correction data drives the variable focus element to adjust the focal depth for each image element.

According to another aspect of the invention, the light source is moved to vary the focal length instead of introducing a variable focus lens to vary the focal length.

According to another aspect of the invention, the light source emits light toward a mirror that reflects the light toward a lens of the display. The mirror is movable about an axis causing the angle of reflection to vary. A control signal determines the position of the mirror and thus the angle of reflection. As the angle of reflection varies, the focal distance of light exiting the lens varies proportionately.

According to another aspect of the invention, an augmented display includes variable accommodation. The scanning beam display is augmented to include a background image upon which a virtual image is augmented. An object within the virtual image is scanned to have an apparent distance within the field of view. Thus, a virtual object may be placed within a real world background view. The apparent distance is controlled by controlling the curvature of the light waves which scan the object pixels onto the viewer's eye.

According to another aspect of the invention, distance of a background image object is measured and used to specify the apparent distance of a virtual object to be placed in proximity to such background image object.

According to another aspect of this invention, the intensity of a virtual image is controlled relative to measured intensity of a background image. As a result, the relative contrast between the virtual image and background image may be the same even within different background image intensities. Further, the virtual image intensity can be controlled to be approximately the same as the background image for a more realistic viewing effect.

One advantage of varying the curvature of light is that the produced image is more life-like, enhancing the user's feeling of presence. These and other aspects and advantages of the invention will be better understood by reference to the following detailed description taken in conjunction with the accompanying drawings.

BRIEF DESCRIPTION OF THE DRAWINGS

FIG. 10 is a diagram of a variably transmissive eyepiece for an embodiment of the display of FIG. 1;

FIG. 11 is a diagram of an electro-mechanically variable focus lens for an optics subsystem of FIG. 1 according to an embodiment of this invention;

FIG. 12 is a diagram of an alternative variable focus lens embodiment for the optics subsystem of FIG. 1;

FIG. 13 is a diagram of another alternative variable focus lens embodiment for the optics subsystem of FIG. 1;

FIG. 14 is a diagram of a plurality of cascaded lens for the optics system of FIG. 1 according to an embodiment of this invention;

FIG. 15 is an optical schematic of a virtual retinal display according to another embodiment of this invention;

FIG. 16 is an optical schematic of a virtual retinal display according to another embodiment of this invention;

FIG. 21 is a diagram of a scanning beam augmented display embodiment of this invention; and FIG. 22 is a diagram of a control portion of the display of FIG. 21.

DESCRIPTION OF SPECIFIC EMBODIMENTS

Overview

Figure 1:
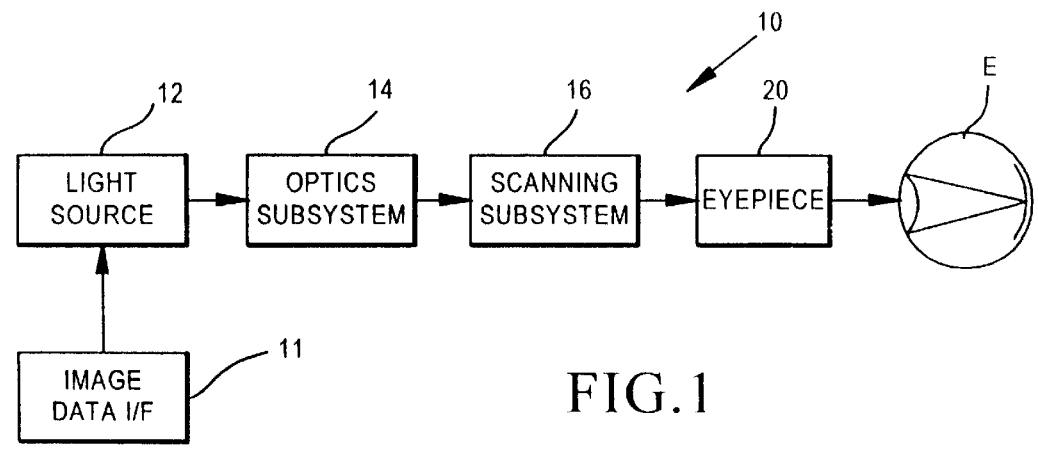
FIG. 1 is a block diagram of a virtual retinal display according to an embodiment of this invention.

FIG. 1 is a block diagram of a scanning light beam display 10 having variable accommodation according to an embodiment of this invention. The display 10 generates and manipulates light to create color or monochrome images having narrow to panoramic fields of view and low to high resolutions. Light modulated with video information is scanned directly onto the retina of a viewer's eye E to produce the perception of an erect virtual image. The display 10 is small in size and suitable for hand-held operation or for mounting on the viewer's head. The display 10 includes an image data interface 11 that receives a video or other image signal, such as an RGB signal, NTSC signal, VGA signal or other formatted color or monochrome video or image data signal. Such signal is received from a computer device, video device or other digital or analog image data source. The image data interface generates signals for controlling a light source 12. The generated light is altered according to image data to generate image elements (e.g., image pixels) which form an image scanned onto the retina of a viewer's eye E.

The light source 12 includes one or more point sources of light. In one embodiment red, green, and blue light sources are included. The light sources or their output beams are modulated according to the input image data signal content to produce light which is input to an optics subsystem 14. Preferably the emitted light is spatially coherent.

The scanning display 10 also includes an optics subsystem 14, a scanning subsystem 16, and an eyepiece 20. Emitted light passes through the optics subsystem 14 and is deflected by the scanning subsystem 16. Typically light is deflected along a raster pattern, although in an alternative embodiment another display format such as vector imaging can be used. In one embodiment the scanning subsystem 16 receives a horizontal deflection signal and a vertical deflection signal derived from the image data interface 11. In another embodiment, the scanning subsystem 16 includes a mechanical resonator for deflecting passing light.

According to an aspect of this invention the optics subsystem 14 includes a device for varying the curvature of light impinging upon the eye E. According to an alternative aspect of the invention, the display 10 instead includes a device for moving the light source position with time to vary the curvature of light impinging upon the eye E.

Embodiments in Which Optics Subsystem Varies Curvature

Figure 2:
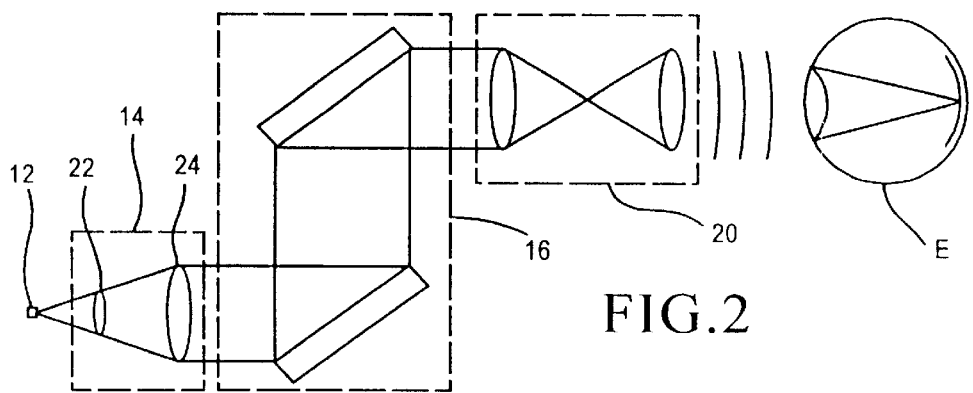
FIG. 2 is an optical schematic of the virtual retinal display according to an embodiment of this invention.
Figure 3:
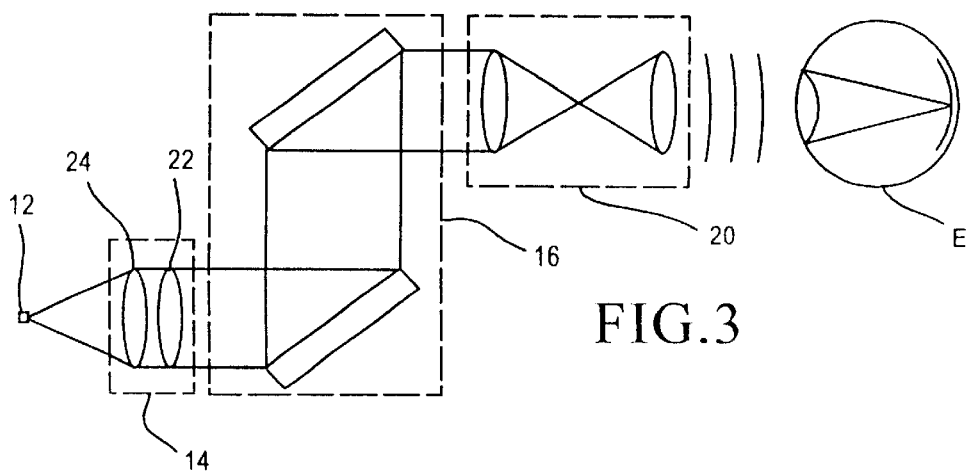
FIG. 3 is an optical schematic of the virtual retinal display according to another embodiment of this invention.

FIGS. 2–5 show optical schematics for alternative embodiments in which the optics subsystem 14 includes a variable focus lens 22 for varying the curvature of light impinging upon the eye E. FIGS. 2 and 3 are similar but have the variable focus lens 22 for varying curvature located at different locations. In the FIG. 2 embodiment light from point source(s) 12 passes through the variable focus lens 22 then through a collimating lens 24 before travelling to the scanning subsystem 16 and eyepiece 20. In the FIG. 3 embodiment light from the point source(s) 12 passes through a collimating lens 24 then through the variable focus lens 22 before travelling to the scanning subsystem 16 and eyepiece 20. The light passing from the eyepiece 20 to the eye E has its curvature varied over time based upon the control of variable focus lens 22. For some image elements the curvature is of one contour to cause the eye to focus at a first focal length. For other image elements the curvature is of another contour to causes the eye to focus at a second focal length. By controlling the curvature, the display 10 controls the apparent focus of the eye, and thus causes different image elements to appear to be located at different distances.

Figure 4:
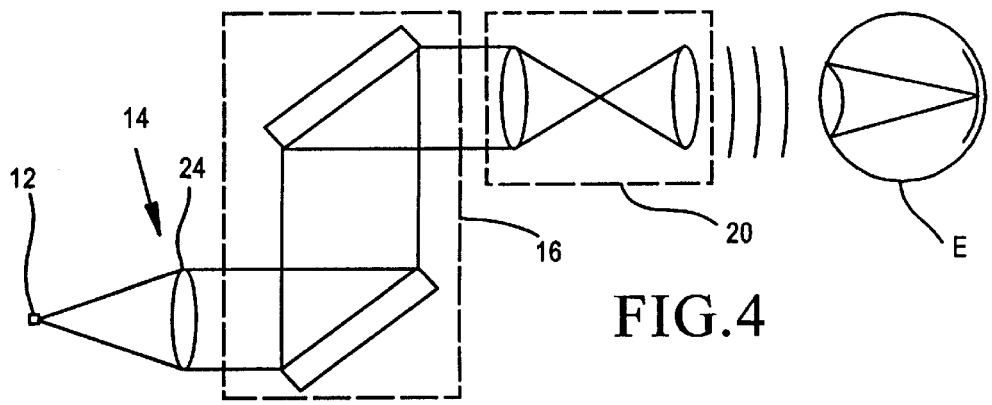
FIG. 4 is an optical schematic of a virtual retinal display without a variable focus lens.

FIG. 4 shows an optical schematic of a display without the variable focus lens 22. Note that the light impinging on the eye E is formed by planar waves. In such embodiment all optical elements appear at a common, indeterminate depth.

Figure 5:
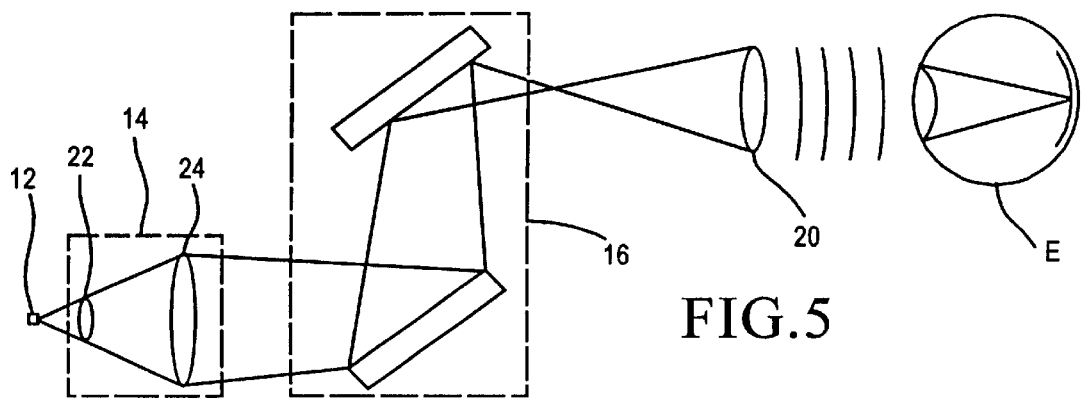
FIG. 5 is an optical schematic of the virtual retinal display according to another embodiment of this invention.
Figure 6:
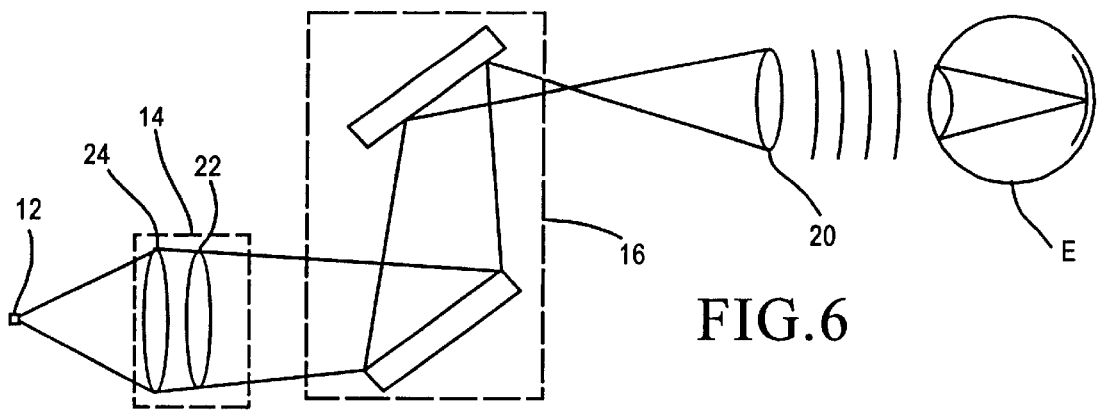
FIG. 6 is an optical schematic of the virtual retinal display according to another embodiment of this invention.
Figure 7:
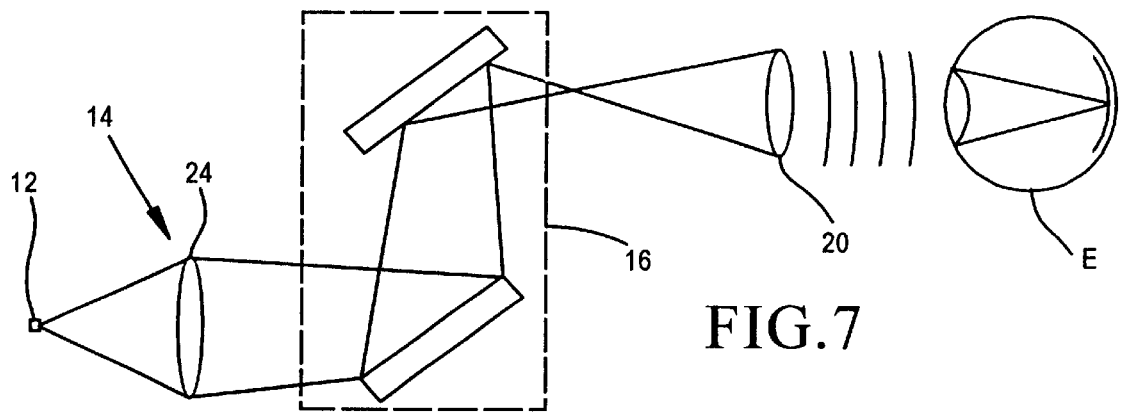
FIG. 7 is an optical schematic of another virtual retinal display without a variable focus lens.

FIGS. 5 and 6 are similar to FIGS. 2 and 3, but are for an optics subsystem 14 which converges the light rather than one which collimates the light. FIG. 7 shows an optical schematic of a virtual retinal display without the variable focus lens 22. Note that the light impinging on the eye E for the FIG. 7 embodiment is formed by planar waves. In such embodiment all optical elements appear at a common indeterminate depth. In FIG. 5 light from a point source(s) 12 passes through the variable focus lens 22 then through a converging lens 24 before travelling to the scanning subsystem 16 and eyepiece 20. In the FIG. 6 embodiment light from the point source(s) 12 passes through a converging lens 26 then through the variable focus lens 22 before travelling to the scanning subsystem 16 and eyepiece 20. The light passing from the eyepiece 20 to the eye E has its curvature varied over time based upon the control of variable focus lens 22.

Figure 8:
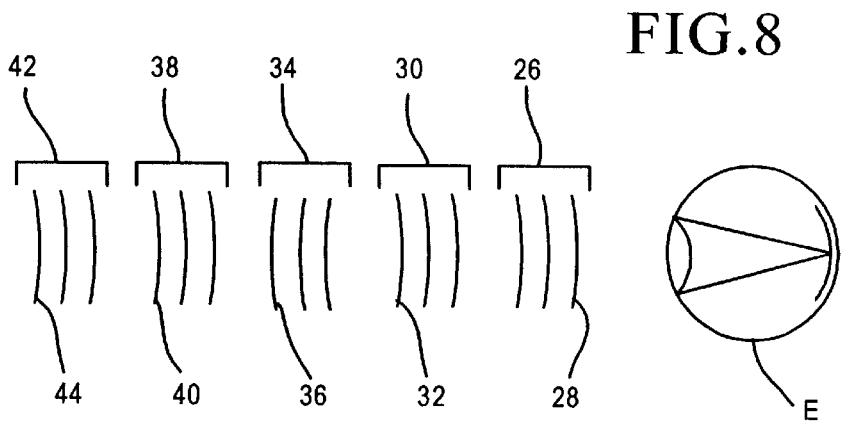
FIG. 8 is a diagram of light directed toward an eye for depicting light curvature for sequential image elements.

FIG. 8 shows a pattern of light impinging on the eye. The scanning beam display device controls the curvature of scanning light waves impinging on the eye to simulate image points of differing depth. Images at far distances out to infinity have flat light waves impinging the eye. Images at near distances have convex-shaped light waves impinging the eye. The light is shown as a sequence of light. For a first image element 26 the corresponding light 28 has one curvature. For another image element 30, the corresponding light 32 has another curvature. Light 36, 40, 44 for other image elements 34, 38, 40 also is shown. A sequence of image elements is scanned upon the eye E to generate an image perceived by the eye. To simulate an object at a far distance the light waves transmitted from the display to the eye are flat. To simulate closer objects, the light wave curvature increases. The curvature of the generated light waves relates to the desired, 'apparent distance' (i.e., focus distance) between a virtual object and the eye. The eye responds to the changing curvature of the light waves by altering its focus. The curvature of the light changes over time to control the apparent depth of the image elements being displayed. Thus, varying image depth is perceived for differing portions of the scanned image.

Light Source

The light source 12 includes a single or multiple light sources. For generating a monochrome image a single monochrome source typically is used. For color imaging, multiple light sources are used. Exemplary light sources are colored lasers, laser diodes or light emitting diodes (LEDs). Although LEDs typically do not output coherent light, lenses are used in one embodiment to shrink the apparent size of the LED light source and achieve flatter wave fronts. In a preferred LED embodiment a single mode, monofilament optical fiber receives the LED output to define a point source which outputs light approximating coherent light.

In one embodiment red, green, and blue light sources are included. In one embodiment the light source 12 is directly modulated. That is, the light source 12 emits light with an intensity corresponding to image data within the image signal received from the image data interface 11. In another embodiment the light source 12 outputs light with a substantially constant intensity that is modulated by a separate modulator in response to the image datadrive signal. The light output along an optical path thus is modulated according to image data within the image signal received from the image data interface 11. Such modulation defines image elements or image pixels. Preferably the emitted light 31 is spatially coherent.

Additional detail on these and other light source 12 embodiments are found in U.S. Pat. No. 5,596,339 to Furness, et al., entitled "Virtual Retinal Display with Fiber Optic Point Source" which is incorporated herein by reference.

Image Data Interface

As described above, the image data interface 11 receives image data to be displayed as an image data signal. In various embodiments, the image data signal is a video or other image signal, such as an RGB signal, NTSC signal, VGA signal or other formatted color or monochrome video or graphics signal. An exemplary embodiment of the image data interface 11 extracts color component signals and synchronization signals from the received image data signal. In an embodiment in which an image data signal has embedded red, green and blue components, the red signal is extracted and routed to a modulator for modulating a red light point source output. Similarly, the green signal is extracted and routed to a modulator for modulating the green light point source output. Also, the blue signal is extracted and routed to a modulator for modulating the blue light point source output.

The image data signal interface 11 also extracts a horizontal synchronization component and vertical synchronization component from the image data signal. In one embodiment, such signals define respective frequencies for horizontal scanner and vertical scanner drive signals routed to the scanning subsystem 16.

Scanning Subsystem

The scanning subsystem 16 is located after the light sources 12, either before or after the optics subsystem 14. In one embodiment, the scanning subsystem 16 includes a resonant scanner 200 for performing horizontal beam deflection and a galvanometer for performing vertical beam deflection. The scanner 200 serving as the horizontal scanner receives a drive signal having a frequency defined by the horizontal synchronization signal extracted at the image data interface 11. Similarly, the galvanometer serving as the vertical scanner receives a drive signal having a frequency defined by the vertical synchronization signal VSYNC extracted at the image data interface. Preferably, the horizontal scanner 200 has a resonant frequency corresponding to the horizontal scanning frequency.

Figure 9:
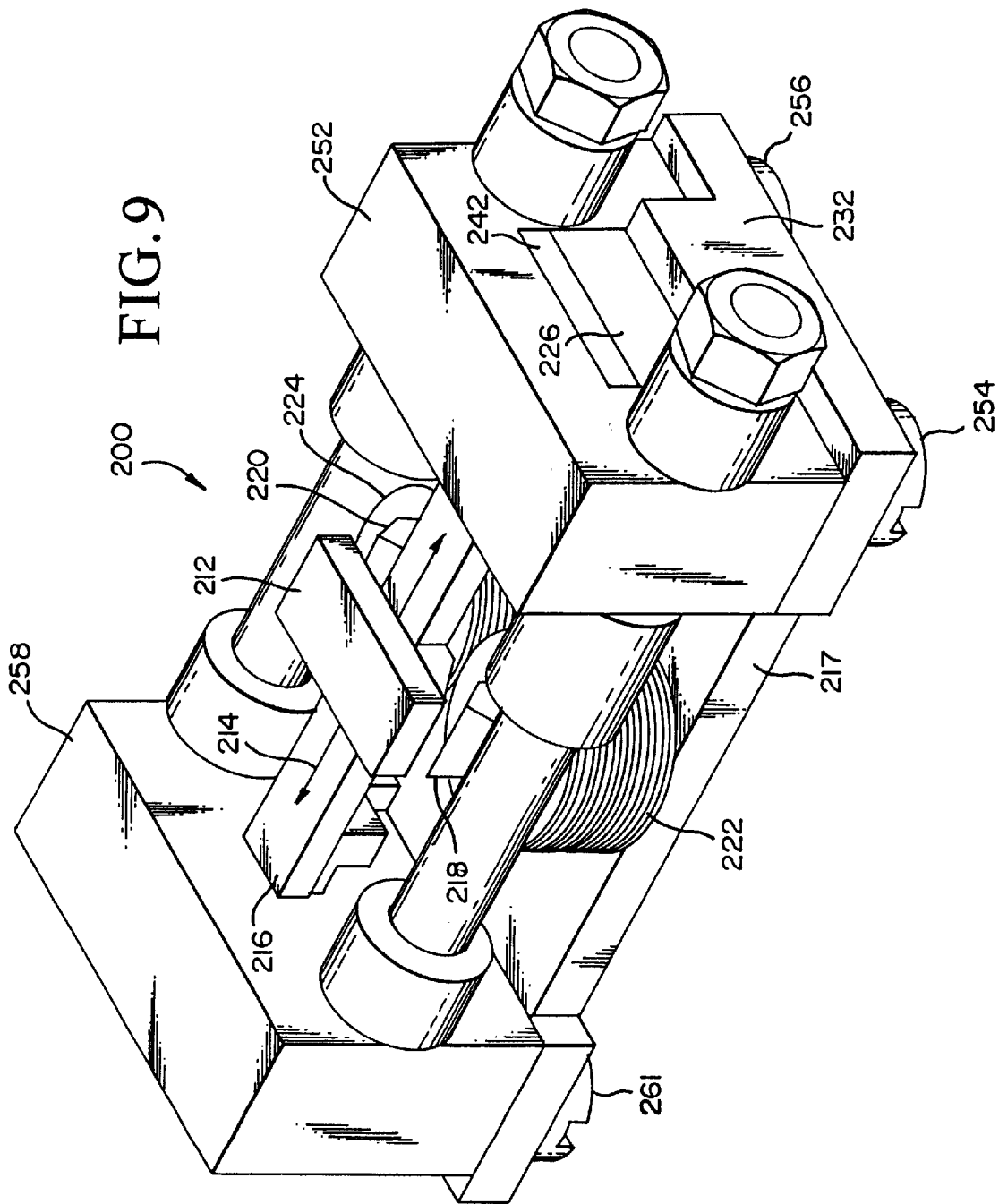
FIG. 9 is a perspective drawing of an exemplary scanning subsystem for the display of FIG. 1.

Referring to FIG. 9, one embodiment of the scanner 200 includes a mirror 212 driven by a magnetic circuit so as to oscillate at a high frequency about an axis of rotation 214. In this embodiment the only moving parts are the mirror 212 and a spring plate 216. The optical scanner 200 also includes a base plate 217 and a pair of electromagnetic coils 222, 224 with a pair of stator posts 218, 220. Stator coils 222 and 224 are wound in opposite directions about the respective stator posts 218 and 220. The electrical coil windings 222 and 224 may be connected in series or in parallel to a drive circuit as discussed below. Mounted on opposite ends of the base plate 217 are first and second magnets 226, the magnets 226 being equidistant from the stators 218 and 220. The base 217 is formed with a back stop 232 extending up from each end to form respective seats for the magnets 226.

The spring plate 216 is formed of spring steel and is a torsional type of spring having a spring constant determined by its length and width. Respective ends of the spring plate 216 rest on a pole of the respective magnets 226. The magnets 226 are oriented such that they have like poles adjacent the spring plate.

The mirror 212 is mounted directly over the stator posts 218 and 220 such that the axis of rotation 214 of the mirror is equidistant from the stator posts 218 and 220. The mirror 212 is mounted on or coated on a portion of the spring plate.

Magnetic circuits are formed in the optical scanner 200 so as to oscillate the mirror 212 about the axis of rotation 214 in response to an alternating drive signal. One magnetic circuit extends from the top pole of the magnets 226 to the spring plate end 242, through the spring plate 216, across a gap to the stator 218 and through the base 217 back to the magnet 226 through its bottom pole. Another magnetic circuit extends from the top pole of the other magnet 226 to the other spring plate end, through the spring plate 216, across a gap to the stator 218 and through the base 217 back to the magnet 226 through its bottom pole. Similarly, magnet circuits are set up through the stator 220.

When a periodic drive signal such as a square wave is applied to the oppositely wound coils 222 and 224, magnetic fields are created which cause the mirror 212 to oscillate back and forth about the axis of rotation 214. More particularly, when the square wave is high for example, the magnetic field set up by the magnetic circuits through the stator 218 and magnets 226 and 228 cause an end of the mirror to be attracted to the stator 218. At the same time, the magnetic field created by the magnetic circuits extending through the stator 220 and the magnets 226 cause the opposite end of the mirror 212 to be repulsed by the stator 220. Thus, the mirror is caused to rotate about the axis of rotation 214 in one direction. When the square wave goes low, the magnetic field created by the stator 218 repulses the end of the spring plate 216. At the same time, the stator 220 attracts the other end of the spring plate 216. Both forces cause the mirror 212 to rotate about the axis 214 in the opposite direction.

In alternative embodiments, the scanning subsystem 14 instead includes acousto-optical deflectors, electro-optical deflectors, rotating polygons or galvanometers to perform the horizontal and vertical light deflection. In some embodiments, two of the same type of scanning device are used. In other embodiments different types of scanning devices are used for the horizontal scanner and the vertical scanner.

Eyepiece

Referring to FIGS. 2–4 the eyepiece 20 typically is a multi-element lens or lens system receiving the light beam (s) prior to entering the eye E. In alternative embodiments the eyepiece 20 is a single lens (see FIGS. 5–7). The eyepiece 20 serves to relay the rays from the light beam(s) toward a viewer's eye. In particular the eyepiece 20 contributes to the location where an exit pupil of the scanning display 10 forms. The eyepiece 20 defines an exit pupil at a known distance d from the eyepiece 20. Such location is the approximate expected location for a viewer's eye E.

In one embodiment the eyepiece 20 is an occluding element which does not transmit light from outside the display device 10. In an alternative embodiment, an eyepiece lens system 20 is transmissive to allow a viewer to view the real world in addition to the virtual image. In yet another embodiment, the eyepiece is variably transmissive to maintain contrast between the real world ambient lighting and the virtual image lighting. Referring to FIG. 10, a photosensor 300 detects an ambient light level. Responsive to the detected light level, a control circuit 302 varies a bias voltage across a photochromatic material 304 to change the transmissiveness of the eyepiece 20. Where the ambient light level is undesirably high, the photochromatic material 304 blocks a portion of the light from the external environment so that the virtual image is more readily perceivable.

Optics Subsystem

Returning to FIGS. 2–7, the optics subsystem 14 receives the light output from the light source, either directly or after passing through the scanning subsystem 16. In some embodiments the optical subsystem collimates the light. In another embodiment the optics subsystem converges the light. Left undisturbed the light converges to a focal point then diverges beyond such point. As the converging light is deflected, however, the focal point is deflected. The pattern of deflection defines a pattern of focal points. Such pattern is referred to as an intermediate image plane.

According to an aspect of the invention, the optics subsystem 14 includes an optical device for varying the curvature of light over time. Specifically the curvature pattern of the light entering the eye E for any given image element is controlled via the variable focus lens 22. In some embodiments the lens 22 has its focus varied by controlling the thickness of the lens 22. In other embodiment the lens 22 has its focus varied by varying the index of refraction of the lens 22.

The curvature of the light exiting lens 22 is controlled by changing the shape of the lens 22 or by changing the index of refraction of the lens 22. A lens which changes its shape is shown in FIG. 11 and will be referred to as an electro-mechanically variable focus lens (VFL) 320. A central portion 322 of the VFL 320 is constructed of a piezoelectric resonant crystalline quartz. In operation, a pair of transparent conductive electrodes 324 provide an electrical field that deforms the piezoelectric material in a known manner. Such deformation changes the thickness of the central portion 322 along its optical axis to effectively change the focus of the VFL 320.

Because the VFL 320 is a resonant device, its focal length varies periodically in a very predictable pattern. By controlling the time when a light pulse enters the resonant lens, the effective focal position of the VFL 320 can be controlled.

In some applications, it may be undesirable to selectively delay pulses of light according to the resonant frequency of the VFL 320. In such cases, the VFL 320 is designed to be nonresonant at the frequencies of interest, yet fast enough to focus for each image element.

In another alternative embodiment, the variable focus lens is formed from a material that changes its index of refraction in response to an electric field or other input. For example, the lens material may be an electrooptic or acoustooptic material. In the preferred embodiment, the central portion 322 (see FIG. 10) is formed from lithium niobate, which is both electrooptic and acoustooptic. The central portion 322 thus exhibits an index of refraction that depends upon an applied electric field or acoustic energy. In operation, the electrodes 324 apply an electric field to control the index of refraction of the lithium niobate central portion 322. In another embodiment a quartz lens includes a transparent indium tin oxide coating.

In another embodiment shown in FIG. 12, a lens 330 includes a compressible cylindrical center 332 having a gradient index of refraction as a function of its radius. A cylindrical piezoelectric transducer 334 forms an outer shell that surrounds the cylindrical center 332. When an electric filed is applied to the transducer 334, the transducer 334 compresses the center 332. This compression deforms the center 332, thereby changing the gradient of the index of refraction. The changed gradient index changes the focal length of the center 332.

In another embodiment shown in FIG. 13 the variable focus element is a semiconductor device 350 that has an index of refraction that depends upon the free carrier concentration in a transmissive region 352. Applying either a forward or reverse voltage to the device 350 through a pair of electrodes 354 produces either a current that increases the free-carrier concentration or a reverse bias that depletes the free carrier concentration. Since the index of refraction depends upon the free carrier concentration, the applied voltage can control the index of refraction.

In still another embodiment shown in FIG. 14 a plurality of lenses 360–362 are cascaded in series. One or more piezoelectric positioners 364–366 move one or more of the respective lenses 360–362 along the light path changing the focal distance of the light beam. By changing the relative position of the lenses to each other the curvature of the light varies.

One use of the variable focus lens 22 is to correct the curvature of an intermediate image plane for errors introduced by the scanning system 16 or for aberrations introduced by other optical elements. For example, in the embodiment of FIG. 13 a aberration map of the overall optical path is stored in a look-up table in memory 370. The aberration map is a set of determined correction data representing the desired amount or variation in the focal length of the variable focus element for each pixel of an image. Control electronics 372 retrieve a value from the table for each pixel and apply a corresponding voltage or other input to adjust the focal depth to correct for the aberration.

Light Source That Moves to Vary Light Wave Curvature

FIGS. 15 and 16 show embodiments of a scanning display 50/50' in which the light source 13 includes one or more moving point sources 15. FIG. 15 shows a display device 50 having an optics subsystem 14 and eyepiece 20 that collimates the light. FIG. 16 shows a display device 50' having an optics subsystem 14 and eyepiece 20 that converges the light. In each of the embodiments of FIGS. 15 and 16, the point sources 15 move along an axis 54 normal to a plane of the optics subsystem 14. Thus, the point sources 15 are moved either closer to or farther from the optics 14. The changing distance between the point source 15 and the optics 14 changes the apparent distance of the point source 15 as viewed through the lens 14. Moving the point source in one direction causes a virtual image portion to appear farther away to the viewer. Moving the point source 15 in the opposite direction causes the virtual image portion to appear closer to the viewer. This is represented by the varying curvature of the light wavefronts 56 shown in FIGS. 15 and 16. By controlling the distance of the point source 15 from the optics 14 the focus of an image portion varies.

Responsive to a control signal, a position controller 60 determines the distance from the point source 15 to the optics 14 for each pixel or group of pixels. In one embodiment, the controller 60 includes a piezoelectric actuator that moves the point sources 15. In another embodiment the controller 60 includes an electromagnetic drive circuit that moves the point sources 15. The axis of motion of actuator or drive circuit is aligned with the direction at which the point sources 15 emit light, so that motion of the point sources 15 does not produce shifting of the location of the respective pixel in the user's field of view.

Figure 17:
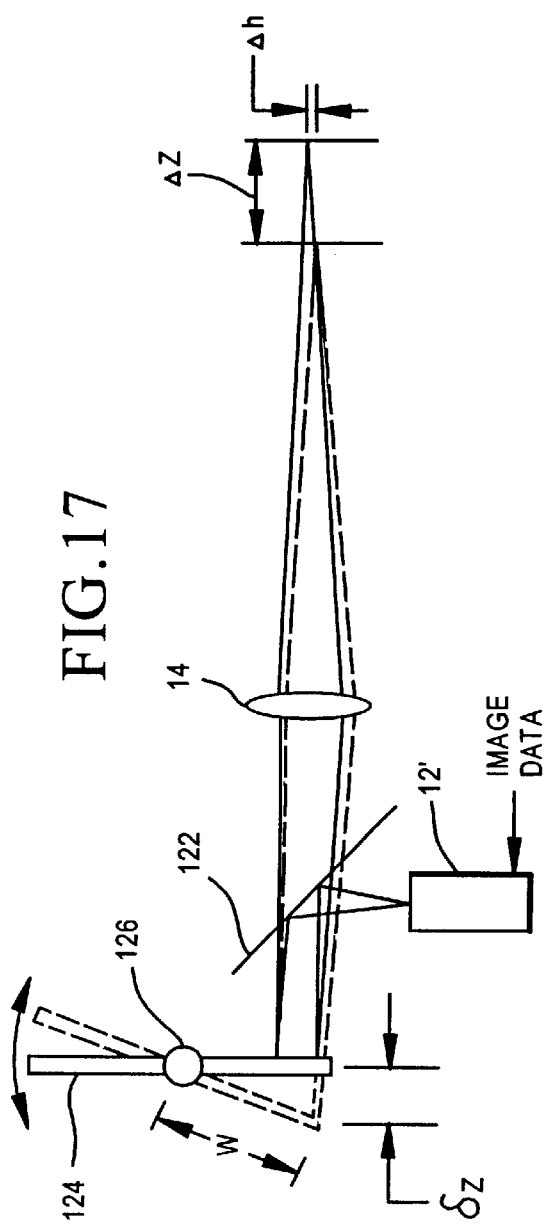
FIG. 17 is a diagram of an optical source with position controller of FIGS. 10 and 11 according to an embodiment of this invention.

FIG. 17 shows an embodiment for moving the apparent location of the point source 15. Light emitted from a light source 12 impinges on a partially reflective surface 122 that deflects the light toward a mirror 124. The mirror 124 reflects the light back through the partially reflective surface 122, which transmits the light to the optics 14. The angle at which the light impinges the optics 14 is determined by the orientation of the mirror 124. Such orientation is adjustable. In one embodiment the mirror 124 is movable about a pivot line 126. In an initial position the mirror 124 orientation is normal to the light impinging its surface. For a movement of the mirror 124 by an angle $\delta z$ the focal point of the light exiting the optics 14 varies by a distance $\Delta z$ and a height $\Delta h$. For a mirror 124 which receives the light at a distance w much greater than the arc distance $\delta z$, the distance $\Delta z$ is much greater than the change in height $\Delta h$. Accordingly, the height $\Delta h$ differential is not significant for many applications. Rotation of the mirror 124 thus varies the focal distance for each image pixel without significantly affecting the apparent location of the pixel.

Figure 18:
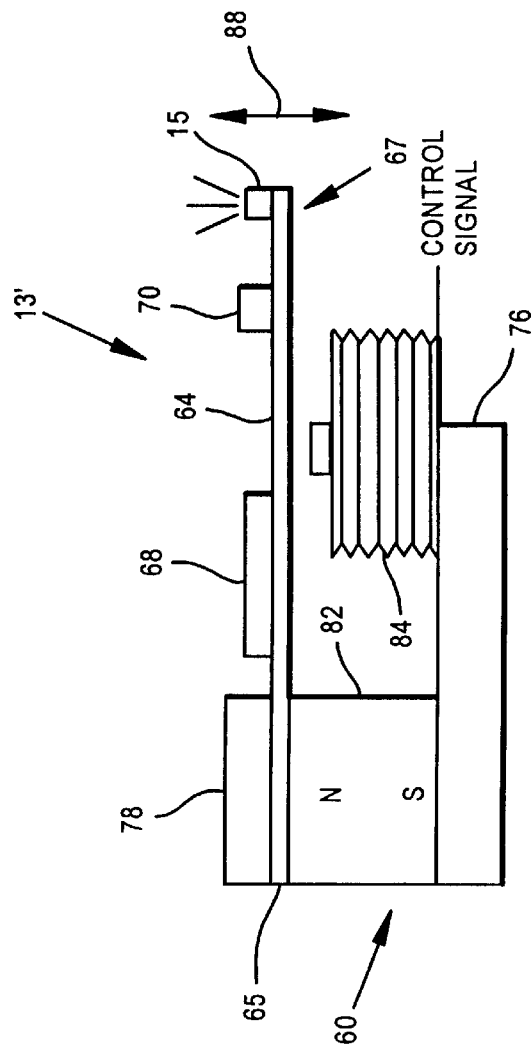
FIG. 18 is a diagram of an optical source with position controller of FIGS. 10 and 11 according to another embodiment of this invention.

FIG. 18 shows a light source 13' according to another embodiment of this invention. The light source includes a light emitter 15 that emits a beam of light. In one embodiment the light emitter 15 is a laser diode. In another embodiment, the light emitter 15 is a light emitting diode with optics for making the output light coherent.

The light emitter 15 is carried by a support 64. In one embodiment the support 64 is formed of spring steel and is a cantilever type of spring. The cantilever spring has a spring constant determined by its length, width and thickness. Preferably, the support 64 is resonant with a high Q value such that once the support starts moving very little energy is lost. As a result, very little energy is added during each period of movement to maintain a constant amplitude of motion of the support 64. For a high Q system the energy loss per cycle is less than 0.001%. The support 64 is anchored at one end 65 and is free at an opposite end 67. Preferably, a position sensor monitors the position of the support 64 and light emitter 15. In some embodiments a common mode rejection piezoelectric sensor 68 is used. In other embodiments a sensor 70 responsive to changing inertia is used. An exemplary sensor 68 is described in such U.S. Pat. No. 5,694,237 issued Dec. 2, 1997 entitled "Position Detection of Mechanical Resonant Scanner Mirror."The light source 13' also includes a base 76, a cap 78 and an electromagnetic drive circuit 60, formed by a permanent magnet 82 and an electromagnetic coil 84. The anchored end 65 of the support 64 is held to the permanent magnet 82 by the cap 78. The permanent magnet 82 is mounted to the base 76. The electromagnetic coil 84 receives the control signal causing a magnetic field to act upon the support 64. In another embodiment a piezoelectric actuator is used instead of an electromagnetic drive circuit. The drive circuit 60 moves the support 64 and light emitter 15 along an axis 88 way from or toward the optics 14 (of FIG. 15 or 16) to vary the focal distance of the light exiting the display.

Figure 19:
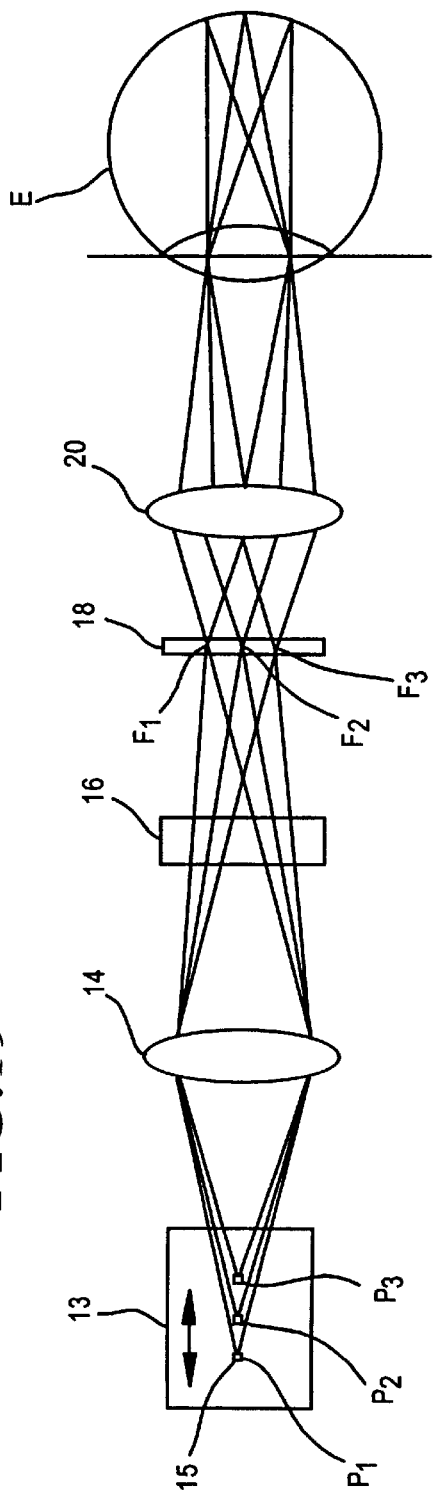
FIG. 19 is an optical schematic of a virtual retinal display according to another embodiment of this invention.

In some embodiments the controller 60 moves the light emitter 15 to generate a flat post-objective scan field. In effect the controller varies the focal point of the emitted light to occur in a flat post-objective image plane for each pixel component of an intermediary image plane 18 (see FIG. 19). FIG. 19 shows a point source 15 at three positions over time, along with three corresponding focal points F1, F2 and F3 along an intermediary image plane 18.

Figure 20:
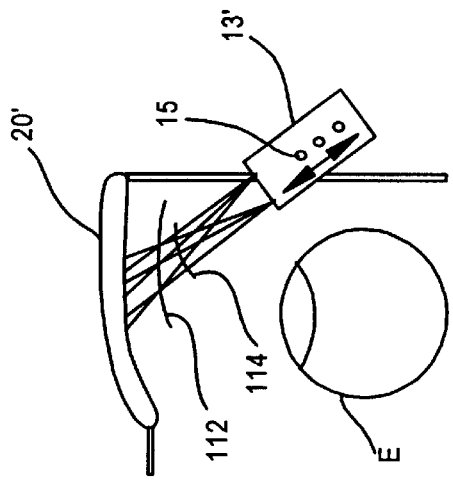
FIG. 20 is a diagram of a display apparatus embodiment of this invention mounted to eyeglasses that serve as an eyepiece for the display apparatus.

In another embodiment the curvature of the intermediary real image is varied to match the curvature of an eyepiece 20' as shown in FIG. 20. As the position of the light emitter 15 varies, the curvature of the image light 110 varies. As the light is scanned along the eyepiece 20', the curvature of the light is varied to match the curvature of the eyepiece 20' at the region where the light impinges the eyepiece 20'. FIG. 20 shows a first curvature 112 for one position of the light emitter 15 and a second curvature 114 for another position of the light emitter 15.

Augmented Scanning Beam Display

FIG. 21 shows a preferred embodiment in which the scanning beam display is an augmented display 150 which generates a virtual image upon a background image. The background image may be an ambient environment image or a generated image. The virtual image is overlaid upon all or a portion of the background image. The virtual image may be formed of virtual two-dimensional or three-dimensional objects which are to be placed with a perceived two-dimensional or three-dimensional background image environment. More specifically, virtual objects are displayed to be located at an apparent distance within the field of view.

As previously described, the display device controls the curvature of scanning light waves impinging on the eye to simulate image points of differing depth. Images at far distances out to infinity have flat light waves impinging the eye. Images at near distances have convex-shaped light waves impinging the eye. To simulate an object at a far distance the light waves transmitted from the display to the eye are flat. To simulate closer objects, the light wave curvature increases. The eye responds to the changing curvature of the light waves by altering its focus. The curvature of the generated light waves relates to a desired apparent focal distance between a virtual object and the eye.

The augmented scanning beam display 150 receives an image signal 152 from an image source 154. The display 150 includes an image data interface 11, one or more light sources 12, a lensing or optics subsystem 14, a scanning subsystem 16, a beamsplitter 156, a concave mirror 158 and an eyepiece 20. Like parts performing the same or similar functions relative to the display 10 of FIG. 1 are given the same part numbers. In one embodiment, the beamsplitter 156 and mirror 158 serve as the eyepiece. In other embodiments another lens (not shown) is included to serve as eyepiece 20.

The image source 154 which generates the image signal 152 is a computer device, video device or other digital or analog image data source. The image signal 152 is an RGB signal, NTSC signal, VGA signal, SVGA signal, or other formatted color or monochrome video or image data signal. In response to the image signal 152, the image data interface 11 generates an image content signal 160 for controlling the light source 12 and one or more synchronization signals 162 for controlling the scanning subsystem 16.

The light source 12 includes one or more point sources of light. In one embodiment red, green, and blue light sources are included. In one embodiment the light source 12 is directly modulated. That is, the light source 12 emits light with an intensity corresponding to the image content signal 160. In another embodiment the light source 12 outputs light with a substantially constant intensity that is modulated by a separate modulator in response to the signal 160. Light 164 is output from the light source 12 along an optical path, being modulated according to the image data within the image content signal 160. Such modulation defines image elements or image pixels. Preferably the emitted light 164 is spatially coherent.

The light 164 is output to the optics subsystem 14 and the scanning subsystem 16. The scanning subsystem 16 includes a horizontal scanner and a vertical scanner. In one embodiment, the horizontal scanner includes a mechanical resonator for deflecting passing light. Typically the light is deflected along a raster pattern, although in an alternative embodiment another display format such as vector imaging can be used.

The scanning subsystem 16 deflects the light along a raster pattern toward the eye E, or as in the embodiment illustrated, toward the beamsplitter 156. The beamsplitter 156 passes both background light 166 and virtual image light 168 to the viewer's eye E. The concave mirror 158 focuses the light onto the eye E. The eye perceives the background image and an overlaid virtual image. The image pixels forming the virtual image are scanned onto the viewer's eye. When the virtual image is updated and rescanned periodically at a requisite frequency, the viewer perceives a continuous, virtual image.

The augmented display 150 also includes one or more light sensors 170, 172 and a controller 174. Referring to FIGS. 21 and 22, light sensor 170 detects the intensity of the background light 166. The controller 174 receives the detected light intensity and generates a signal 176 which in response adjusts the intensity of the virtual image light 168. In one embodiment the virtual image light 168 intensity is adjusted by controlling the intensity of light 164 output by the light source 12. For example, controller 174 outputs a control signal 176 to the light source 12 to vary the light source 12 intensity.

Sensor 172 detects the distance of a background object or other focal viewing point of the background image light 166. Such sensor 172 is a conventional sensor of the kind used in cameras for determining object distance in connection with a camera's autofocus function. The controller 174 with the sensor 172 generates a signal 178 for controlling the apparent distance of a virtual object to be overlaid upon the background object. In one embodiment the control signal 178 is input to the variable focus lens 22 to adjust the curvature of the light waves forming the virtual image light 168. In an alternative embodiment, the control signal 178 moves the light source 12 to vary the curvature of the light waves forming the virtual image light 168. In some embodiments, multiple sensors 172 are included for measuring background distance for many points within the background viewing field. The measuring points correspond to differing areas within the field of view. The measured distance for a given area is used to specify a distance for a virtual object to be overlaid upon the corresponding image area. Although, the term overlaid is used, the virtual object may be in part overlaid and in part underlaid relative to a background object or background image area, as desired. Accordingly, a virtual image area is generated having an apparent distance which is correlated to a real world image, and more particularly, to a real world image distance. More generally, a virtual image area is generated having an apparent distance which is correlated to a background image, and more particularly, to a background image distance.

For varying applications, in addition to controlling the content and positioning of a virtual object, the object's shading, shadowing and other imaging effects can be controlled to achieve a desired realistic, surrealistic, or non-realistic effect. For example, in a gaming application virtual scenes may be superimposed upon a player's immediate background environment (e.g., the player's home, the woods, et cet.). In a flight simulator, simulated terrain may be the source of the background image light, while simulated aircraft, targets or other objects may serves as the virtual objects. In such example, the terrain simulator replaces or provides the inputs to the sensors 170, 172.

In some embodiments, the background area onto which an opaque virtual object is overlaid is blanked. Commonly-assigned U.S. patent application Ser. No. 09/009,759 of Charles D. Melville entitled, Augmented Imaging Using A Silhouette To Improve Contrast, filed Jan. 20, 1998 is incorporated herein by reference and made a part hereof. Such application describes the use of a silhouette display to blank out areas of background light to improve the contrast for a virtual image area.

Although preferred embodiments of the invention have been illustrated and described, various alternatives, modifications and equivalents may be used. Therefore, the foregoing description should not be taken as limiting the scope of the inventions which are defined by the appended claims.

What is claimed is:

1. A scanning display apparatus, comprising:
    an image signal source operative to produce an image signal;
    a focal control signal source generating a focal control signal;
    a light emitter coupled to the image signal source and responsive to the image signal to emit light;
    a lens which receives light from the light emitter and which passes exiting light, the exiting light having a focal distance; and
    a controller responsive to the focal control signal for controlling distance between the light emitter and the lens by moving the lens relative to the light emitter without deforming the lens, wherein the focal distance of the light exiting the lens varies with the distance between the light emitter and the lens.

2. The apparatus of claim 1, in which the controller comprises an electromagnetic drive circuit.

3. The apparatus of claim 1, in which the controller comprises a piezoelectric actuator.

4. The apparatus of claim 1, in which the light emitter is one of a plurality of light emitters coupled to the image signal source and responsive to the image signal to emit light toward the lens.

5. The apparatus of claim 1, serving as an augmented display, and further comprising a beamsplitter which receives the exiting light and which further receives background light.

6. The apparatus of claim 1, further comprising a light sensor which detects intensity of the background light and a controller which responds to the detected intensity to control intensity of the emitted light.

7. A scanning display apparatus, comprising:
    an image signal source operative to produce an image signal;
    a focal control signal source generating a focal control signal;
    a light emitter coupled to the image signal source and responsive to the image signal to emit light;
    a lens which receives light from the light emitter and which passes exiting light, the exiting light having a focal distance;
    a controller responsive to the focal control signal for controlling distance between the light emitter and the lens, wherein the focal distance of the light exiting the lens varies with the distance between the light emitter and the lens; and
    a signal source responsive to the received background light which varies the focal control signal to correlate the controlled distance to the background light.

8. The apparatus of claim 7, further comprising a distance sensor which detects distance of an object within a background field of view from which the background light is received, and wherein the signal source is responsive to the received background light from the object and varies the focal control signal to correlate the controlled distance to the detected distance of the object.

9. A scanning display apparatus, comprising:
    an image signal source operative to produce an image signal;
    a focal control signal source generating a focal control signal;
    a light emitter coupled to the image signal source and responsive to the image signal to emit light;
    a mirror receiving the light from the light emitter, the mirror movable about an axis in response to the focal control signal to vary an angle at which the light is reflected from the mirror; and
    a lens which receives light from the mirror and which passes exiting light, the exiting light having a focal distance, wherein the angle of the mirror determines the focal distance of light exiting the lens.

10. The apparatus of claim 9, in which the light emitter is one of a plurality of light emitters coupled to the image signal source and responsive to the image signal to emit light toward the lens.

11. A scanning display apparatus, comprising:
    an image signal source operative to produce an image signal;
    a focal control signal source generating a focal control signal;

a light emitter coupled to the image signal source and responsive to the image signal to emit light;

a lens which receives light from the light emitter and which passes exiting light, the exiting light having a focal distance; and a controller responsive to the focal control signal for controlling distance between the light emitter and the lens by moving the light emitter relative to the lens, wherein the focal distance of the light exiting the lens varies with the distance between the light emitter and the lens.

12. The apparatus of claim 11, in which the controller comprises an electromagnet drive circuit.

13. The apparatus of claim 11, in which the controller comprises a piezoelectric actuator.

14. The apparatus of claim 11, in which the light emitter is one of a plurality of light emitters coupled to the image signal source and responsive to the image signal to emit light toward the lens.

15. The apparatus of claim 11, serving as an augmented display, and further comprising a beamsplitter which receives the exiting light and which further receives background light.

16. The apparatus of claim 11, further comprising a light sensor which detects intensity of the background light and a controller which responds to the detected intensity to control intensity of the emitted light.

* * * * *